Dec. 18, 1923.

L. B. SHARPNACK

ROTARY VENTILATOR

Filed Jan. 21, 1922

1,477,669

Inventor
Lord B. Sharpnack,

By
Attorneys

Patented Dec. 18, 1923.

1,477,669

UNITED STATES PATENT OFFICE.

LORD B. SHARPNACK, OF DETROIT, MICHIGAN.

ROTARY VENTILATOR.

Application filed January 21, 1922. Serial No. 530,750.

*To all whom it may concern:*

Be it known that I, LORD B. SHARPNACK, a citizen of the United States of America, residing at Detroit, in the county of Wayne and State of Michigan, have invented certain new and useful Improvements in Rotary Ventilators, of which the following is a specification, reference being had therein to the accompanying drawings.

In my Patent No. 1,314,432, granted Aug. 26, 1919, there is disclosed a rotary ventilator, which includes, among other things, a stationary outlet member provided with a hood; a rotary casing about said outlet member and having a center piece supported above said hood by a novel bearing, and a shell interposed between the rotary casing and said outlet member cooperating therewith in causing air to produce a partial vacuum so that air, smoke, gases and foul matter may be drawn through the outlet connection and exhausted to the atmosphere.

This invention particularly relates to the bearing between the hood of the ventilator and the center pieces which supports the rotary casing, and the present invention aims to provide a center bearing wherein antifrictional members are employed to receive lateral and end thrusts and prevent vertical and lateral displacement of the center piece of the casing relative to the hood of the ventilator.

My invention further aims to provide antifrictional bearings that may be advantageously used between parts of a rotary ventilator, and the bearings include a stationary race member, a rotary race member extending into the stationary race member, and anti-frictional members between said stationary and rotary race members. These various members are assembled so as to be protected from the elements and at the same time afford lubricant wells in which a suitable lubricant may be placed to insure easy turning of the rotary part of the ventilator by wind.

The construction entering into my invention will be hereinafter described and then claimed, and reference will now be had to the drawings, wherein—

Figure 1:
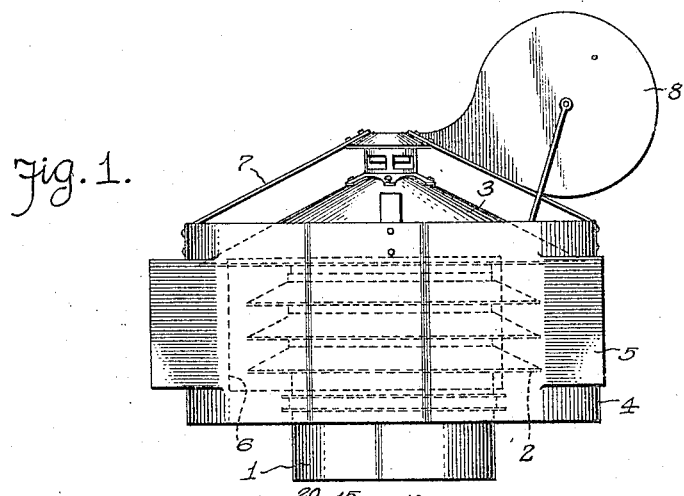
Figure 1 is a side elevation of a rotary ventilator in accordance with my invention.

In order that the use of my bearing may be understood I show in the drawing my rotary ventilator which includes an outlet connection 1 having deflectors 2 and a hood 3; a rotary casing 4 having side wings 5; a shell 6 between the outlet member 1 and the rotary casing 4; a spider 7 provided with a vane 8, and a bearing supporting the spider relative to the hood 3.

As mentioned in the beginning, my invention resides in an anti-frictional bearing which supports the spider 7 relative to the stationary hood 3, and mounted on the top of the hood 3 is an upstanding cylindrical or hollow center member 9 having its walls provided with a plurality of openings 10 so that the elements cannot readily lodge within the center member. Adjacent the top of the center member 9 is an annular inwardly projecting stationary race member 11 having an inner annular wall or sleeve portion 12, and said race member affords annular races 13 and 14, which are rectangular in cross section.

Suitably connected to the spider 7 is a two-part center piece 15 and detachably connected to the center piece 15 is a cylindrical or hollow portion 16 affording a lower race member 17 and an annular race 18 which is rectangular in cross section and confronts the race 13 of the race member 11. The center piece 15 has a configuration affording an annular groove 19 and an annular race 20 which is rectangular in cross section, said race confronting the race 14 of the stationary race member 11, and the upper end of the stationary race member 11 extends into the annular groove 19 of the center piece 15.

Figure 2:
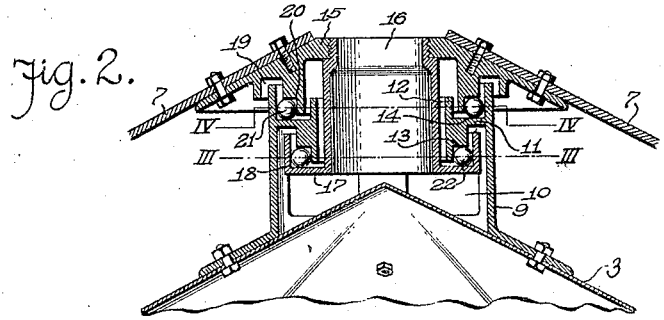
Fig. 2 is an enlarged vertical sectional view of the bearing of the ventilator.
Figures 3, 4:
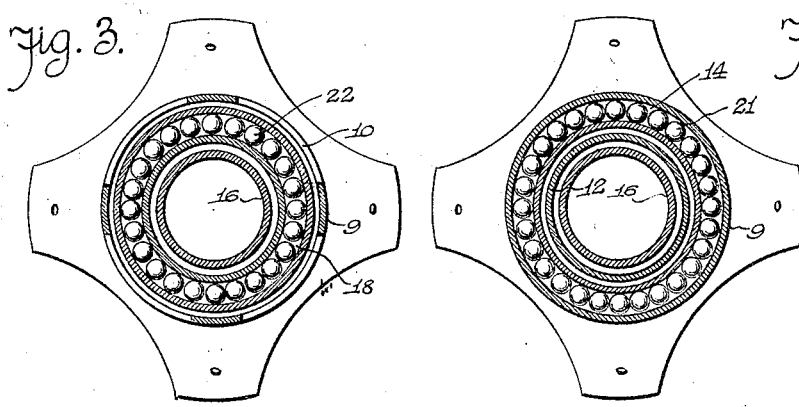
Fig. 3 is a horizontal sectional view taken on the line III—III of Fig. 2.
Fig. 4 is a similar view taken on the line IV—IV of Fig. 2.

Engaging the races 14 and 20 are a series of anti-frictional members 21 and engaging the races 13 and 18 are a series of anti-frictional members 22, the members 21 and 22 preferably being in the form of balls, as best shown in Figs. 3 and 4. With the cylindrical portion 16 detachably connected to the center piece 15, preferably by screw threads, the anti-frictional members and rotary race members can be easily assembled relative to the stationary race members and by reference to Fig. 2, it will be noted that the anti-frictional members prevent vertical and lateral displacement of the center piece relative to the center member and should there be any side thrust during rotation of the ventilator casing, the bearings will receive such thrust.

The stationary and movable race members are made of a strong and durable material that will withstand the elements, and to insure ease of operation a lubricant can be placed in the race members.

One embodiment of my invention has been illustrated, but it is to be understood that the structural elements are susceptible to such variations and modifications as fall within the scope of the appended claims.

What I claim is:—

1. In a rotary ventilator, a stationary part, a rotary part, means for mounting the rotary part relative to the stationary part, said means comprising anti-frictional bearings constructively arranged above said stationary part and about the axis of said rotary part adapted to support and prevent vertical and lateral displacement of said rotary part relative to said stationary part, said bearings including three annular race members, two of which extend into the other.

2. An anti-frictional bearing for a rotary ventilator part relative to a stationary ventilator part, comprising a stationary race member, rotary race members connected together and extending into said stationary race member, one of said rotary race members having a portion concentric of the other rotary race member, and anti-frictional members between said stationary and rotary race members.

3. An anti-frictional bearing for a rotary ventilator part relative to a stationary ventilator part, comprising a stationary race member affording upper and lower races rectangular in cross section, rotary race members extending into the races of said stationary race member, and anti-frictional members between said stationary and rotary race members.

4. In a rotary ventilator, a center member, an intermediate race member carried thereby, a rotary center piece having portions above and below said race member, and anti-frictional members between said race member and the portions of said center piece.

5. A rotary ventilator as in claim 4, wherein the portions of said center piece which are below said race member are detachable relative to said center piece.

6. In a rotary ventilator, a center member, a center piece extending downwardly at the outer and inner sides of said center member, and anti-frictional members interposed between said center member and said center piece, said center member having a configuration which cooperates with said anti-frictional members in preventing vertical and lateral displacement of said center piece.

In testimony whereof I affix my signature in presence of two witnesses.

LORD B. SHARPNACK.

Witnesses:
ANNA M. DORR,
KARL H. BUTLER.